Figure 1A:
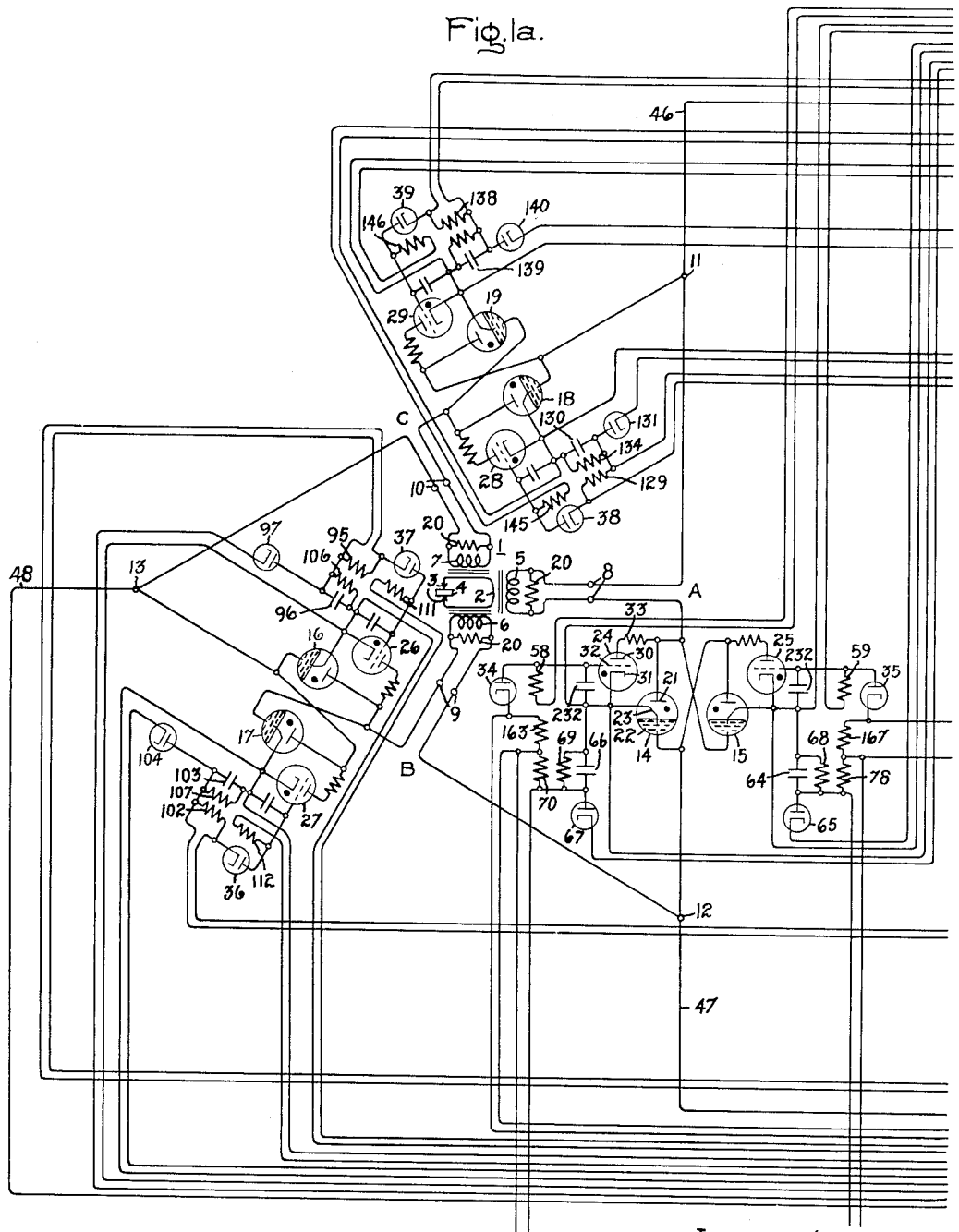

Oct. 18, 1955   M. E. BIVENS ET AL   2,721,302
FREQUENCY AND PHASE CONVERTING CONTROL CIRCUIT
Filed Nov. 14, 1950   4 Sheets-Sheet 1

Inventors:
Maurice E. Bivens,
William B. Hills,
by Claude H. Mott
Their Attorney.

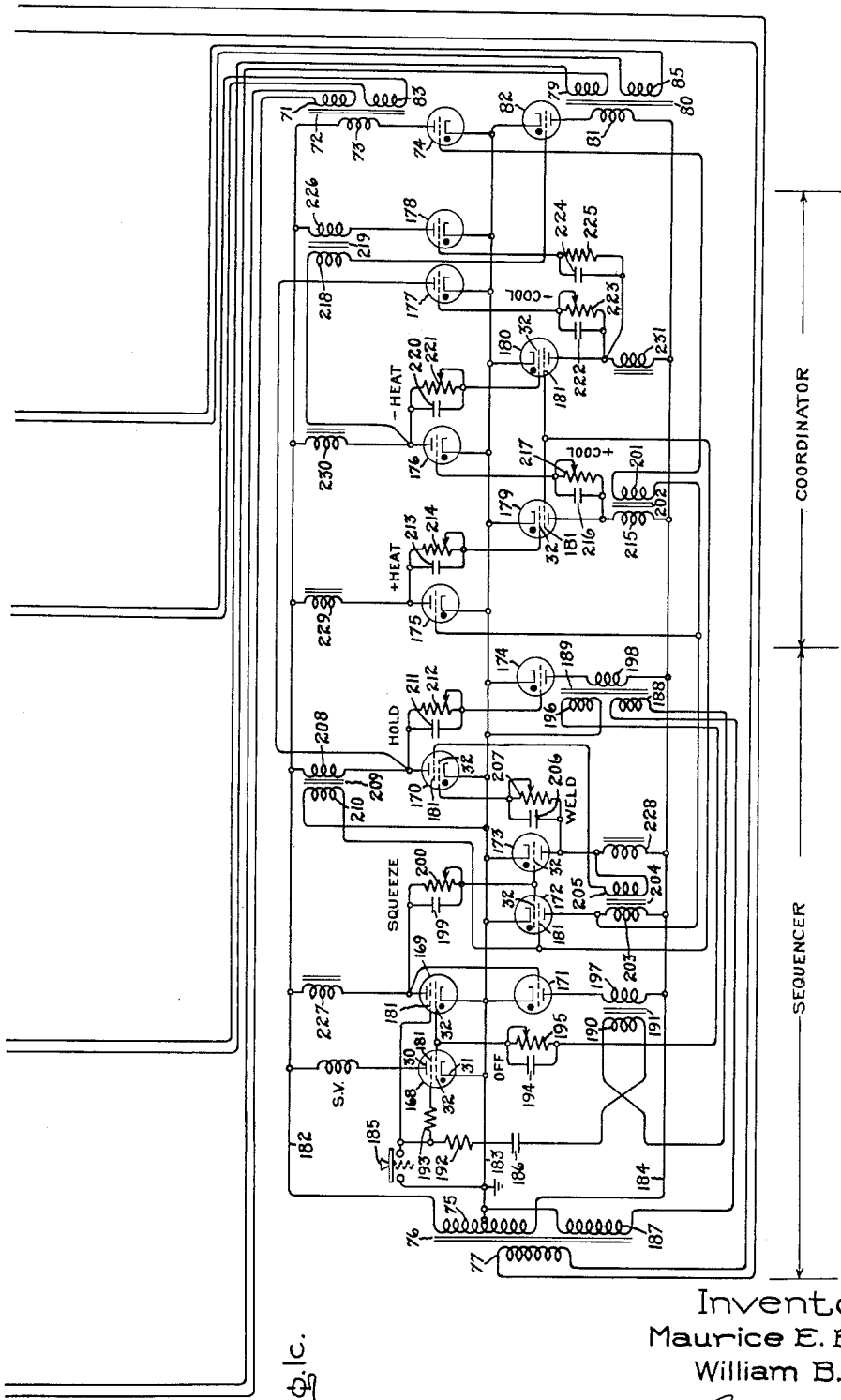

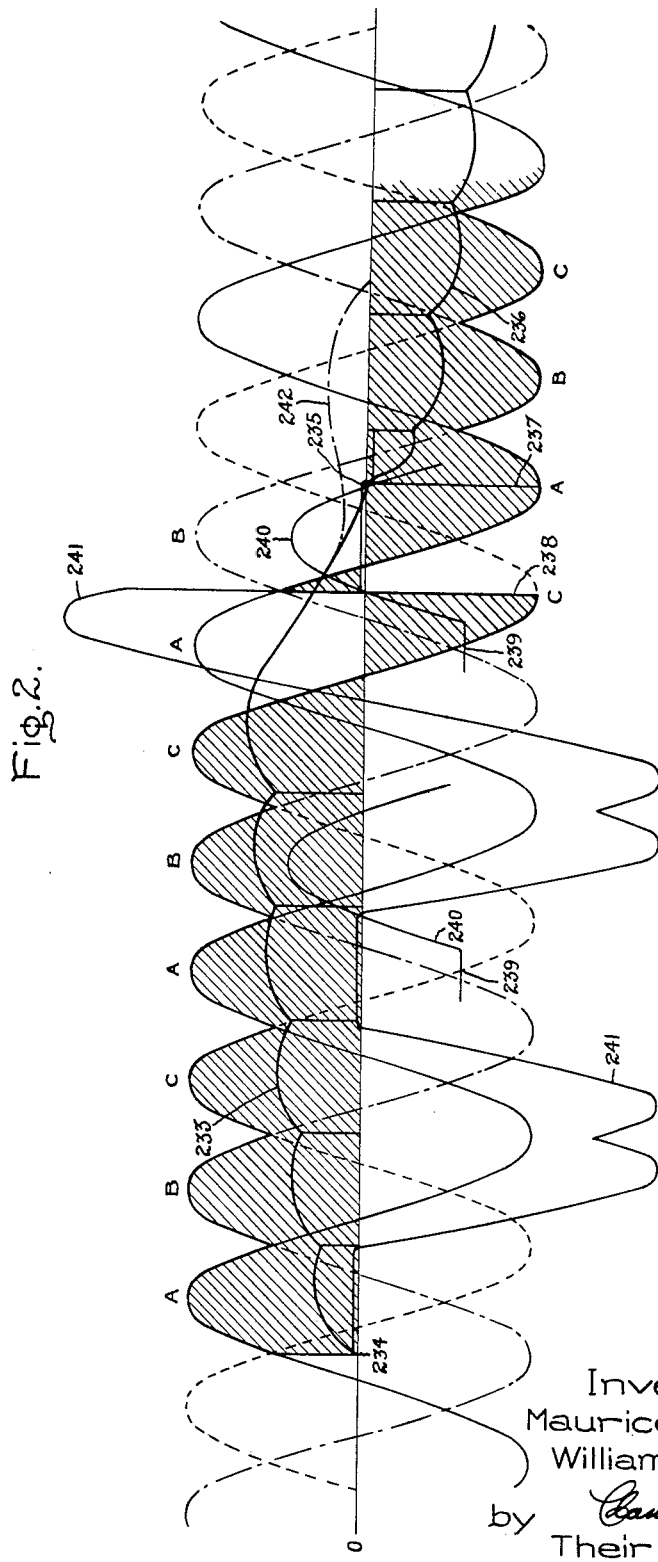

United States Patent Office 2,721,302
Patented Oct. 18, 1955

2,721,302

FREQUENCY AND PHASE CONVERTING CONTROL CIRCUIT

Maurice E. Bivens and William B. Hills, Schenectady, N. Y., assignors to General Electric Company, a corporation of New York Application November 14, 1950, Serial No. 195,536

7 Claims. (Cl. 321—7)

Our invention relates to electronic control circuits and in particular to control circuits forming part of a frequency and phase converting system such as described and claimed in the application of one of us, namely Serial No. 127,374, Maurice E. Bivens, for Electric Sequence and Timing Circuits, filed November 15, 1949, and assigned to the assignee of this invention, now Patent No. 2,614,240.

In the converting system described in the above-identified application, voltages of opposite polarity are fed in phase sequence to three primary windings of a transformer having a single secondary winding magnetically coupled therewith. The energization of the primary windings of the transformer in phase sequence for a predetermined number of times first with voltages of one polarity and then with voltages of the opposite polarity of the three phase source of supply, generates in the secondary winding of the transformer a single phase voltage of lower frequency which may be adjusted as to frequency by an adjustment of the time of current flow through the primary windings first in one direction and then in the other direction and by the time interval between current flow periods in opposite directions through these windings which is required for commutation purposes. Thus, the arrangement constitutes a frequency and phase converter since not only the frequency but also the phase is changed by operation of the system.

Such systems are used for supplying a single phase resistance welding load from a three-phase source of supply because of the advantages obtained in uniformly loading the three-phase source of supply and in reducing the inductive reactance of the load which follows as a direct result of the low frequency of the load current supplied by the secondary of the welding transformer. As a direct result of this arrangement a single phase load of low line frequency power factor may be applied to a three-phase system without producing undesirable voltage fluctuations in the three-phase system each time the single phase load is connected thereto.

Because of the inductive nature of the load, current continues to flow for a time interval dependent upon the inductance in the last three-phase circuit which is conducting during the three phase sequence of conduction employed for generating a half cycle of voltage and current in the secondary winding of the transformer. If while this inductive current is flowing in one of the primary phase windings of the transformer, current flow is initiated in the opposite direction through another of the primary phase windings, due to the coupling of these primary phase windings conditions are established which result in excessive current flow and in effect constitutes a short circuit between phases of the three-phase source of supply connected to these primary phase windings. This is referred to as a commutation fault which in the system of the above referred to application is eliminated by providing a sufficient time interval between the supply of half cycles of alternating current of opposite polarity to the primary phase windings of the transformer following a period of current flow in the opposite direction through these windings. Under certain circumstances this delay period is desirable but where the inductance of the primary load circuit is considerable, the delay period may become so long as to delay unnecessarily the heating effect of the low frequency secondary current supplied to the work by the welding machine electrodes constituting terminals of the secondary winding of the welding transformer. There are also other circumstances, as when welding certain metals such as aluminum, which require that low frequency current flow occur without an excessive time delay between half cycles of opposite polarity.

It is an object of our invention to provide a frequency and phase converter system of the type just discussed by means of which low frequency current may be supplied either with or without the imposition of an adjustable delay period between the positive and negative half cycles of current flow in order to operate successfully under widely varying inductive load operating conditions.

It is a further object of our invention to provide such a system by the addition of only two more control electric discharge devices in addition to those employed in the system of the above-identified application.

Other objects of our invention will become apparent from a consideration of the embodiment thereof illustrated in the accompanying drawings and described below.

Figure 1B:
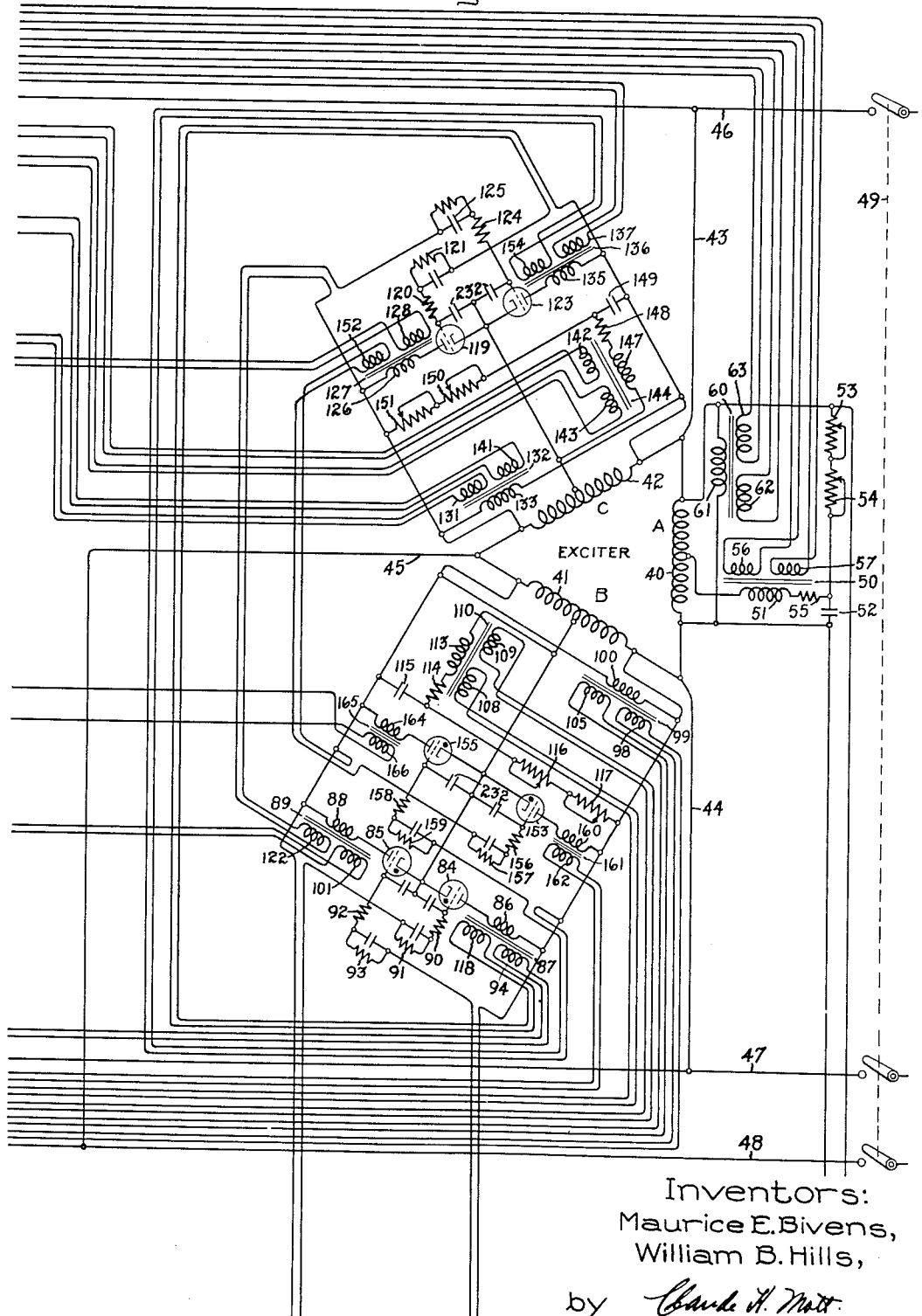

In these drawings one embodiment of our invention is diagrammatically represented in Figs. 1a, 1b and 1c when these figures are assembled so that Fig. 1a is to the left of Fig. 1b and Fig. 1c is at the bottom of Figs. 1a and 1b with the circuits terminating at adjoining edges of these figures being connected together. Fig. 2 is a waveshape diagram which illustrates the voltage relationships occurring in this control and will be referred to in connection with the operation of the system shown in Figs. 1a, 1b and 1c.

In the system illustrated in Figs. 1a, 1b and 1c the phase voltages of a three-phase source of supply are connected to each of the three primary windings of the welding transformer through the anode-cathode circuits of parallel reversely connected electric discharge devices each of which has a control element and a control element circuit connecting its cathode with its control element. Turn-on voltages are supplied in phase sequence in the control element circuits of these electric discharge devices so that one of each pair is rendered conducting for supplying current of one polarity to the primary windings for a predetermined number of complete phase sequences and then after a predetermined time delay turn-on voltages are applied in phase sequence in the control element circuits on the other of these pairs of electric discharge devices for supplying the primary windings of the transformer with current of the opposite polarity. During the predetermined time delay between the application of turn-on voltages for the flow of current of one polarity and the flow of current of the opposite polarity, the electric discharge device which initiated a flow of current of one polarity is again energized near the end of its positive half cycle of anode voltage so that it is again rendered conducting for a period when its anode voltage is negative for inverter action which will terminate the flow of inductive current at a time when the electric discharge device paired therewith and poled for conducting current in the opposite direction is excited for passing current of the opposite polarity. Thus, when current flow of one polarity decreases to zero due to the inverter action of this electric discharge device, conduction is immediately transferred to the electric discharge device paired therewith so that current flows in the opposite direction without any time interval between the flows of these currents of opposite polarity.

The control by means of which this result is obtained will now be described in detail. The resistance welding transformer of our system is shown at 1 at the center of Fig. 1a. Its secondary winding 2 is connected through electrodes 3 to the work 4 being welded. Its primary windings 5, 6 and 7 are respectively connected to pairs of load circuit terminals 8, 9 and 10 each pair of which is respectively connected to different pairs of supply circuit terminals 11, 12 and 13 through the anode-cathode circuits of pairs of parallel inversely connected electric discharge devices 14 to 19 inclusive. For convenience in description, the phase voltage appearing across supply terminals 11 and 12 will be hereinafter referred to as the A phase of the three phase source of supply, and the phase voltages appearing across supply terminals 12 and 13 and 13 and 11 respectively as the B and C phases of the same three phase source of supply. Each of the primary windings 5, 6 and 7 of the transformer 1 may be shunted by resistors 20 to protect them against voltage surges. These resistors may be of the type described and claimed in United States Letters Patent 1,822,742—Karl B. McEachron, September 8, 1931.

Each of the electric discharge devices 14 to 19 inclusive may be of any of the types well-known in the art but as illustrated each comprises an anode 21, a mercury pool cathode 22, and an immersion ignitor-type control element 23. The ignitor elements 23 may be formed of a high resistance material, such as a mixture of boron carbide and silicon carbide, and are arranged in the electric discharge devices so that their tips are immersed in the mercury cathode pools of these electric discharge devices. The elements of each of these electric discharge devices are enclosed in an envelope which preferably contains, as indicated by the dot, an ionizable medium such as a gas or vapor.

Each of the electric discharge devices 14 to 19 inclusive is respectively provided with a firing electric discharge device 24 to 29 inclusive. Each of these electric discharge devices is provided with an anode 30, a cathode 31, and a control element 32 all of which are enclosed in an envelope which preferably contains, as indicated by the dot, an ionizable medium such as a gas or vapor. The anode of each firing electric discharge device is connected through a current limiting resistor 33 to the anode of its associated main electric discharge device and its cathode is connected to the ignitor thereof and consequently also to the cathode of its associated main electric discharge device. Consequently when voltage is applied to the anode 21 of a main electric discharge device, the same anode voltage is applied to anode 30 of its associated firing electric discharge device so that when anode-cathode conduction of this firing electric discharge device is permitted by its control element 32, a circuit is completed through the ignitor 23 of the main electric discharge device which produces the ionization which initiates conduction of the main electric discharge device. Thereafter the flow of load current is taken over by the main electric discharge device and supplied to its connected load. In order to avoid a confusion of reference numbers in the drawings, the parts of the electric discharge devices just described have been identified by numerals applied only to electric discharge devices 24 and 14 since the like symbolism employed for the other electric discharge devices makes complete identification unnecessary. The same is true with regard to current limiting resistors 33 also referred to in connection with these devices.

Each of the firing electric discharge devices 24 to 29 inclusive is provided with a control element circuit which is connected between its control element 32 and its cathode 31. In each instance this control element circuit is divided into two branches which for electric discharge device 24 is connected through a unidirectional conducting device such as the diode 34 so that the more negative of the resultant voltages in these branch circuits controls the conductivity of this firing electric discharge device. Like unidirectional current conducting devices 35 to 39 inclusive are respectively connected in the control element circuits of the firing electric discharge devices 25 to 29 inclusive. It will be noted that in each case these unidirectional current conducting devices are connected in their circuits with their anodes toward the control elements of these electric discharge devices.

Control voltages are supplied to the control element circuits of the firing electric discharge devices 24 to 29 inclusive by an exciter illustrated in Fig. 1b and in the extreme right portion of Fig. 1c. This exciter comprises three autotransformers 40, 41 and 42 which are connected in delta with one another and through conductors 43, 44 and 45 to conductors 46, 47 and 48 which are also connected to the supply terminals 11, 12 and 13 of the load circuit portion of the control. Conductors 46, 47 and 48 are connected and disconnected from a source of three phase supply voltage by means of a switch 49.

The interconnection of the exciter circuit with the power circuit is such that an A phase voltage is applied to transformer 40, a B phase voltage is applied to transformer 41 and a C phase voltage is applied to transformer 42 so that these transformers may supply respectively control voltages to load circuit pairs of electric discharge devices 24 to 29 inclusive connected across the same three phase voltages.

A phase shift voltage is supplied to the control element circuits of the A phase firing electric discharge devices 24 and 25 through the agency of a transformer 50 having its primary winding 51 connected across a mid tap terminal of transformer winding 40 and the terminal of a capacitor 52 which is connected with adjustable resistors 53 and 54 which are series connected with one another and this capacitor across the end terminals of transformer 40. One of these adjustable resistors 53 and 54 may be adjusted for "full heat" corresponding to conduction initiated in the firing electric discharge devices at the power factor phase angle of the load and the other provides for a further adjustment to retard the phase of the control voltages for adjustments whereby the heat is decreased by securing conduction of these firing electric discharge devices at a point later in the half cycle of their anode voltages than the power factor phase angle. A transient suppressing resistor 55 is connected in series circuit with the primary winding 51 of the phase shift transformer 50. This transformer is provided with two secondary windings 56 and 57. One of these transformer windings 57 is connected in series circuit with a resistor 58 across the control element and cathode of firing electric discharge device 24 to form one branch of its control element circuit and the other of these transformer windings 56 is connected in series with a resistor 59 across the control element and cathode of firing electric discharge device 25 to form one branch of its control element circuit. These windings are polarized in such a manner that when the unidirectional conducting devices 34 and 35 are not conducting, voltages are applied to the control elements of the firing electric discharge devices 24 and 25 which render them conducting at the desired times in their positive anode voltages which are determined by the adjustment of the static phase shift circuit by adjustment of the phase shift resistor thereof which may be the adjustable resistor 53, when the other adjustable resistor 54 is employed for the full heat adjustment.

A transformer 60 having its primary 61 connected across transformer 40 provides a negative bias voltage in the other branch of each of the control element circuits of firing electric discharge devices 24 and 25. This transformer is provided with two secondary windings 62 and 63. Secondary winding 62 of this transformer charges a capacitor 64 through a rectifier 65 and secondary winding 63 of this transformer charges a capacitor 66 through a rectifier 67. The arrangement is such that the positive terminals of capacitors 64 and 66 are respectively connected toward the cathodes of the firing electric discharge devices 25 and 24 and thus supply a negative bias voltage to the control elements of these electric discharge devices whenever the unidirectional conducting devices 35 and 34 are conducting, thus rendering ineffective the phase shift control voltages in the other branches of the control element circuits of these electric discharge devices. Discharge resistors 68 and 69 are connected across the terminals of the capacitors 64 and 66.

When the anode voltage of the firing electric discharge device 24 is positive, it will become conducting in response to the phase shift voltage applied in one branch of its control element circuit when the negative bias voltage of the capacitor 66 in the other branch of this control element circuit is overcome by a voltage appearing across resistor 70 connected in this other branch. This turn-on voltage across resistor 70 is obtained from the secondary winding 71, a transformer 72 having its primary winding 73 connected through the anode-cathode circuit of an electric discharge device 74 for energization from the top portion of a secondary winding 75 of a transformer 76 having a primary winding 77 connected across the terminals of the A phase exciting transformer 40. The arrangement is such that electric discharge device 74 may conduct during a positive half cycle of anode voltage corresponding to the positive half cycle of the same phase of anode voltage applied to the anode of the firing electric discharge device 24. In like manner the effect of the negative bias voltage of capacitor 64 in the other branch of the control element circuit of the firing electric discharge device 25 is overcome by a voltage appearing across the resistor 78 connected in series circuit therewith when the anode voltage of this electric discharge device 25 is positive. The voltage across resistor 78 is obtained from this secondary 79 of a transformer 80 whose primary 81 is connected through the anode-cathode circuit of an electric discharge device 82 across the lower portion of the secondary 75 of transformer 76. The arrangement is such that when a positive anode voltage is applied to the anode of the firing electric discharge device 25 electric discharge device 82 may be conducting to secure the voltage across resistor 78.

Electric discharge devices 74 and 82 of the exciter, and the other electric discharge devices thereof which will be identified below, are each provided with an anode, a cathode and a control element, all of which are enclosed in an envelope which preferably contains, as indicated by the dot, an ionizable medium such as a gas or vapor. Where necessary these elements of each device will be identified by the same reference numbers 30, 31 and 32 previously employed for like devices in Fig. 1a but for purposes of reducing confusion, these reference numbers have not been applied to each of them in the drawings since the like symbolism employed makes this unnecessary.

Conduction of electric discharge device 74 also results in energization of the secondary winding 83 of transformer 72. This applies a turn-on voltage in the control element circuit of electric discharge device 84 of the exciter. Conduction of electric discharge device 82 also energizes the secondary winding 85 of transformer 80 to apply a turn-on voltage in the control element circuit of electric discharge device 85 of the exciter. The anode-cathode circuit of electric discharge device 84 is connected in series with the primary 86 of a transformer 87 across one-half of the winding of transformer 41 and the anode-cathode circuit of electric discharge device 85 is connected through the primary winding 88 of a transformer 89 across the other half of this transformer winding. The control element circuit of electric discharge device 84 extends from its control element through a current limiting resistor 90, the negative self-biasing means 91 comprising a parallel connected capacitor and resistor, the secondary 83 of the transformer 72 and the other half of the transformer winding 41 which is not connected across the anode-cathode circuit of this electric discharge device. With such connections, the 180 degree out of phase voltage of the other half of transformer winding 41 maintains electric discharge device 84 non-conducting until secondary winding 83 of transformer 72 supplies a turn-on voltage which is of sufficient magnitude to render this electric discharge device conducting. The control element circuit of electric discharge device 85 extends from its control element through a current limiting resistor 92, a negative self-biasing means 93 comprising a parallel connected capacitor and resistor, the secondary 85 of transformer 80, and the other half of the transformer winding 41 which is not connected across the anode-cathode circuit of this electric discharge device. Thus this electric discharge device is held non-conducting by a 180 degree out of phase voltage until the voltage in secondary winding 85 of transformer 80 overcomes this voltage and renders it conducting. The anode-cathode circuit of electric discharge devices 84 and 85 are connected across the halves of transformer winding 41 so that electric discharge device 84 may become conducting in response to voltages of one polarity and electric discharge device 85 may become conducting in response to voltages of the opposite polarity of the B phase transformer 41.

When electric discharge device 84 becomes conducting, the primary 86 of transformer 87 is energized and a voltage is induced in the secondary 94 of this transformer which is applied across resistor 95 connected in that branch of the control element circuit of firing electric discharge device 26 which is completed through the unidirectional conducting device 37. A negative phase voltage is impressed in this same branch of the control element circuit of the firing electric discharge device 26 by a capacitor 96 which is charged through a rectifier 97 with voltage supplied from the secondary winding 98 of a transformer 99 having its primary 100 connected across the end terminals of transformer 41.

When the electric discharge device 85 becomes conducting it energizes the primary 88 of transformer 89 and induces a voltage in its secondary 101 which appears across a resistor 102 in opposition to the bias voltage of capacitor 103 connected in series circuit therewith in that branch of the control element circuit of firing electric discharge device 27 which is completed through the unidirectional conducting device 36. Capacitor 103 is charged through a rectifier 104 by voltage supplied from the secondary 105 of transformer 99. Each of the capacitors 96 and 103 are respectively provided with discharge resistors 106 and 107.

Phase shift voltages are applied in the other branches of the control element circuits of firing electric discharge devices 26 and 27 through the secondaries 108 and 109 of transformer 110. These secondary windings are respectively connected through resistors 111 and 112 across the control element and cathode of each of these electric discharge devices. The primary winding 113 of transformer 110 is connected in series with a transient suppressing resistor 114 across the mid tap of transformer winding 41 and the terminal of a capacitor 115 which is connected toward adjustable resistances 116 and 117 which are connected in series with one another and this capacitor across the end terminals of transformer 41. The arrangement is thus seen to be the same as that previously described in connection with phase A and transformer 40.

Conduction of electric discharge device 84 also results in the energization of the secondary winding 118 of transformer 87. This winding is connected in the control element circuit of electric discharge device 119. The control element circuit for this electric discharge device extends from its control element through a current limiting resistor 120, a negative self-biasing means 121, the secondary winding 118 of transformer 87, and the half of transformer winding 42 across which the anode-cathode circuit of electric discharge device 119 is not connected.

Conduction of electric discharge device 85 by energizing transformer 89 also induces a voltage in the secondary 122 thereof which is applied in the control element circuit of electric discharge device 123. The control element circuit for electric discharge device 123 extends from its control element through a current limiting resistor 124, a negative self-biasing means 125, the secondary 122 of transformer 89, and the half of transformer winding 42 across which the anode-cathode circuit of this electric discharge device is not connected. Thus in each case the electric discharge devices 119 and 123 are held non-conducting by the 180 degree out of phase voltages applied to their control elements until turn-on voltages are induced in the secondaries 118 and 122 of transformers 87 and 89. The anode-cathode circuits of these electric discharge devices 119 and 123 are connected across the two halves of transformer winding 42 so that one of them may become conducting during half cycles of voltage of one polarity and the other during half cycles of voltage of the opposite polarity.

When electric discharge device 119 becomes conducting it energizes the primary winding 126 of a transformer 127 and induced a voltage in the secondary 128 of this transformer which appears across a resistor 129 in opposition to the bias voltage of a capacitor 130 connected in series therewith and with unidirectional conducting device 38 in one branch of the control element circuit of firing electric discharge device 28. Capacitor 130 is charged through a rectifier 131 by the voltage supplied from the secondary 141 of a transformer 132 having its primary 133 connected across the end terminals of transformer 42 for the C phase. A discharge resistor 134 is connected across the terminals of capacitor 130.

When electric discharge device 123 becomes conducting it energizes the primary winding 135 of a transformer 136 and induces in the secondary 137 of this transformer a voltage which appears across a resistor 138 connected in series with capacitor 139 and unidirectional conducting device 39 to form one branch of the control element circuit of firing electric discharge device 29. Capacitor 139 is charged through a rectifier 140 by voltage supplied from the secondary 141 of transformer 132.

Phase control voltages are supplied in the other branches of the control element circuits of firing electric discharge devices 28 and 29 by the secondaries 142 and 143 of the phase shift transformer 144. Secondary 142 is connected in series with a resistor 145 across the control element and cathode of firing electric discharge device 28 and secondary 143 is connected in series with resistor 146 across the control element and cathode of firing electric discharge device 29. The primary 147 of the phase shift transformer 144 is connected in series with the transient suppressing resistor 148 across the mid tap terminal of transformer winding 42 and the terminal of a capacitor 149 which is connected toward adjustable resistors 150 and 151 which are connected in series with one another and this capacitor across the end terminals of transformer winding 42.

Conduction of electric discharge device 119 by energizing the primary 126 of transformer 127 induces a secondary voltage in the secondary winding 152 of this transformer which is applied in the control element circuit of electric discharge device 153. Likewise, conduction of electric discharge device 123 by energizing the primary 135 of transformer 136 induces a voltage in the secondary 154 of this transformer which is applied in the control element circuit of electric discharge device 155. Electric discharge devices 153 and 155 are connected across the halves of transformer winding 41 as are electric discharge devices 84 and 85. Their connections are such that electric discharge device 153 conducts in response to voltages of one polarity also applied to electric discharge device 84 and electric discharge device 155 conducts in response to voltages of the opposite polarity also applied to electric discharge device 85. The control element circuit of electric discharge 153 extends from its control element through a current limiting resistor 156, a negative self-biasing means 157, the secondary winding 152 of transformer 127, and the half of transformer winding 41 across which the anode-cathode circuit of this electric discharge device is not connected. The half of the transformer winding 41 in this control element circuit provides a voltage 180 degrees out of phase with that applied to the anode-cathode circuit of the electric discharge device and consequently holds this device non-conducting until the turn-on voltage induced in the secondary winding 152 of transformer 127 overcomes this bias and renders the electric discharge device conducting. The control element of electric discharge device 155 is connected through a current limiting resistor 158, a negative self-biasing means 159, the secondary 154 of transformer 136 and the half of transformer winding 41 across which the anode-cathode circuit of this electric discharge device is not connected. Consequently, this circuit functions in the same manner as the circuit just described for electric discharge device 153.

When electric discharge device 153 becomes conducting it energizes the primary winding 160 of a transformer 161 and thus induces a voltage in the secondary winding 162 of this transformer which appears across a resistor 163 connected in that branch of the control element circuit of firing electric discharge device 24 in which are also connected capacitor 66 and resistor 70 across which a voltage appears as a result of the conduction of electric discharge device 74 as previously described. Conduction of electric discharge device 155 energizes the primary winding 164 of a transformer 165 and thereby energizes its secondary winding 166 which is connected across a resistor 167 connected in series circuit with biasing capacitor 64 and resistor 78 in that branch of the control element circuit of firing electric discharge device 25 which is effective when unidirectional conducting device 35 is conducting. A voltage appears across resistor 78 in response to conduction of electric discharge device 82 as described above.

From the description thus far given it is apparent that the exciter of Fig. 1b is set in operation by the conduction of electric discharge devices 74 and 82 shown in the extreme right portion of Fig. 1c of the drawing. Electric discharge device 74 initiates a positive sequence of phase conduction and electric discharge device 82 initiates a negative sequence of phase conduction. Thus the number of times electric discharge device 74 is rendered conducting during consecutive positive half cycles of its anode voltage will control the length of the low frequency half cycle of one polarity whereas the number of times electric discharge device 82 is rendered conducting during consecutive half cycles of its positive anode voltage will control the length of the low frequency half cycle of the opposite polarity. The conduction of these electric discharge devices 74 and 82 is under the control of a "coordinator" and a "sequencer" which will now be described.

The sequencer and coordinator shown in Fig. 1c determine the order and timing of certain operations. The sequencer determines the sequence of resistance welding operations including a "squeeze" time which delays the flow of welding current until the electrodes have been brought into engagement with the work, a "weld" time which determines the period during which welding current is flowing, a "hold" time which determines the period during which the electrodes are maintained in engagement with the work after a welding operation, and an "off" time which determines the period before the sequence can again be repeated. The coordinator is employed for setting the low frequency of the generated single phase current by determining the number of complete sequences of three phase current flow of one polarity through the primary windings of the welding transformer and of the flow of three phase current of the opposite polarity through these windings for predetermined number of phase sequences. These current flow periods may be identified as the "plus heat" and "minus heat" periods which are respectively separated by "plus cool" and "minus cool" periods which delay conduction of current of the opposite polarity until current flow of the one polarity has come to zero. As previously stated, if current flow of the opposite polarity is initiated before current flow of the one polarity had come to zero, there is a commutation fault in the converter which amounts to a short circuiting of the phases of the three phase source of supply.

The sequencer includes electric discharge devices 168 to 174, inclusive, and the coordinator includes electric discharge devices 175 to 180, inclusive. Each of these electric discharge devices has an anode 30, a cathode 31 and a control element 32. Certain ones of these electric discharge devices also have a second control element 181. These electric discharge devices are 168, 169, 170, 172, 179 and 180. To facilitate the application of other reference numbers, the anodes, cathodes and control elements of these electric discharge devices have been identified by the same reference numbers previously used above, and have not been applied to each of the electric discharge devices, except in the cases where they have two control elements, since the like symbolism employed in the drawing is sufficient identification in view of the reference numbers that have been applied. In this connection the practice employed in Fig. 1c is the same as that previously employed in connection with Figs. 1a and 1b where like electric discharge devices are illustrated. Each of these electric discharge devices 168 to 180, inclusive, has its anode, cathode and control element or control elements enclosed in an envelope which preferably contains, as indicated by the dot, an ionizable medium such as a gas or vapor.

Each of the electric discharge devices 169, 170, 175, 176, 177 and 178 has its anode-cathode circuit connected through an inductive device across supply conductors 182 and 183 which are connected to one half of the secondary winding 75 of transformer 76 and each of the electric discharge devices 171, 172, 173, 174, 179 and 180 has its anode-cathode circuit connected in series with an inductive device across supply conductors 184 and 183 which are connected to the other half of the secondary winding 75 of transformer 76. With this arrangement the anode voltages of each group of electric discharge devices are 180 degrees out of phase and consequently electric discharge devices of one group may conduct during half cycles of supply voltage of one polarity and electric discharge devices of the other group may conduct during half cycles of supply voltage of the opposite polarity. It is to be noted that the electric discharge devices 74 and 82, previously referred to as forming part of the exciter, are connected in like manner across the halves of the secondary 75 of transformer 76.

By reason of the inductance in the anode-cathode circuits of each of the electric discharge devices just described, anode-cathode current initiated in one of these devices during a positive half cycle of anode voltage will continue to flow during the first portion of the next negative half cycle and the voltage drop across the anode-cathode circuit of this electric discharge device, due to this carry-over of current flow, may be used as a control voltage in the control element circuit of another of these electric discharge devices whose anode voltage is positive at that time this current carry-over occurs. This arrangement has been described and claimed in an application of one of us, namely, Serial No. 685,330, Maurice E. Bivens, filed July 22, 1946, for Electric Valve Control Circuit and assigned to the same assignee of this invention. The arrangement will be better understood in view of the following description of the sequencer and coordinator.

The sequencer is set into operation, as is the coordinator, by the closure of push button switch 185. Prior to the closure of this push button switch 185, electric discharge devices 168 and 169 are held non-conducting by the negative bias voltage of capacitor 186 connected in the control element circuits for control elements 181 of these electric discharge devices. This capacitor 186 is charged during the negative half cycles of anode voltage of electric discharge devices 168 and 169 by grid rectification occurring in the following circuit: from the cathodes of electric discharge devices 168 and 169 through conductor 183, the secondary 187 of transformer 76, the secondary 188 of transformer 189, the secondary 190 of transformer 191, capacitor 186 and resistor 192 to the control element 181 of electric discharge device 169 and also the resistor 193 to the control element 181 of electric discharge device 168. If the off time of the welding sequence has not elapsed, a negative bias voltage is also supplied to the control elements 32 of electric discharge devices 168 and 169 by a capacitor 194 connected in the control element circuits of these control elements. These control element circuits extend from the control elements 32 of electric discharge devices 168 and 169 through capacitor 194, which is provided with an adjustable discharge resistor 195 in order to set its timing, and the secondary 196 of transformer 189 to conductor 183 which is connected to the cathodes 31 of these electric discharge devices. If the off time has elapsed the restraint on conduction by control elements 32 of electric discharge devices 168 and 169 is removed and closure of push button switch 185 will connect the other control elements 181 of these electric discharge devices to their cathodes. These devices will consequently conduct and electric discharge device 168 will energize the solenoid valve S. V. forming part of the resistance welder which will consequently open and admit pressure fluid to the pressure cylinder of the welder to bring the electrodes thereof into engagement with the work. Conduction of electric discharge device 169 will cause electric discharge device 171 to conduct in trailing response during the next half cycle of supply voltage and thus energize the primary 197 of a transformer 191. This will induce a voltage in the secondary 190 of transformer 191 which will neutralize the voltage of the secondary 187 of transformer 76 and consequently eliminate the negative bias voltage of capacitor 186 so that once the system is set in operation by closure of push button 185 the sequence will continue even though the switch 185 is again reopened before this sequence is completed. At the end of the hold time in the welding sequence electric discharge device 174 will become conducting thereby energizing its primary winding 198 of transformer 189. The voltage induced in secondary winding 188 of this transformer neutralizes the voltage of winding 190 of transformer 191 thereby permitting secondary 187 of transformer 76 to again charge capacitor 186 and apply a negative hold off bias to the control elements 181 of electric discharge devices 168 and 169. A voltage is also induced in the secondary winding 196 of transformer 189 which charges capacitor 194 to apply a hold off bias to the control elements 32 of electric discharge devices 168 and 169. Until the hold off bias of capacitor 194 is dissipated in the discharge resistor 195 connected across its terminals, electric discharge devices 168 and 169 are held off and cannot conduct even though the push button switch 185 is closed.

After the squeeze time imposed by capacitor 199, whose timing effect is determined by the adjustable resistor 200 connected across its terminals, the anode-cathode drop of electric discharge device 169 applies a turn-on voltage to the control elements 32 of electric discharge devices 172 and 173. Conduction of electric discharge device 172 provides a voltage drop across its anode-cathode circuit which is applied in the control element circuit of electric discharge device 175 and will render this electric discharge device conducting at the beginning of the next positive half cycle of its anode voltage. The anode-cathode drop of electric discharge device 172 is also applied through the secondary 201 of a transformer 202 in the control element circuit of electric discharge device 74 to render this electric discharge device conducting at the beginning of the next half cycle when its anode voltage is positive. Conduction of electric discharge device 172 also energizes the primary 203 of a transformer 204 whose secondary 205 is connected in the control element circuit of control element 181 of electric discharge device 170. The voltage of the secondary winding 205 is of such polarity and magnitude as to prevent conduction of electric discharge device 170 so long as electric discharge device 172 is conducting. Conduction of electric discharge device 173 in response to the conduction of electric discharge device 169 during the preceding half cycle of voltage will, after the time delay of the capacitor 206, apply a turn-on voltage to the control element 32 of electric discharge device 170. Capacitor 206, with its parallel connected adjustable discharge resistor 207, acts as the weld timer.

At the end of the welding period conduction of electric discharge device 170 energizes the primary 208 of a transformer 209 thereby inducing a voltage in the secondary 210 of this transformer which is applied in the control element circuits of the control elements 181 of electric discharge devices 172, 179 and 180 and is effective in preventing reconduction of these electric discharge devices after conduction of electric discharge device 170. Conduction of electric discharge device 170 also applies to the control element of electric discharge device 174 a turn-on voltage which renders this electric discharge device conducting after the time delay for hold imposed by the capacitor 211 connected in the control element circuit of electric discharge device 174. The timing function of capacitor 211 is determined by the adjustable resistor 212 connected across its terminals.

As previously stated above in connection with the description of the sequencer, electric discharge device 175 is rendered conducting by the anode-cathode drop of electric discharge device 172 being applied in the control element circuit of electric discharge device 175. Conduction of electric discharge device 175, after the time delay imposed by a capacitor 213, applies a turn-on voltage in the control element circuit of control element 32 of electric discharge device 179. The time delay for this voltage to become effective is determined by the adjustment of the adjustable resistor 214 connected across the terminals of capacitor 213. After this time delay, electric discharge device 179 will become conducting, provided, of course, it is not held non-conducting by a control voltage applied in the control element circuit of its control element 181.

When electric discharge device 179 becomes conducting, it energizes the primary winding 215 of transformer 202 and thereby introduces a control voltage in its secondary 201 which applies a hold off voltage to the control element of electric discharge device 74. Conduction of electric discharge device 179 also applies, after the time delay imposed by a capacitor 216, a turn-on voltage in the control element circuit of electric discharge device 176 which renders this electric discharge device conducting. The period of time delay imposed by capacitor 216 is determined by the adjustment of the adjustable resistor 217 connected across its terminals. When electric discharge device 176 becomes conducting, its anode-cathode drop is impressed in the control element circuit of electric discharge device 82 which circuit includes the secondary 218 of a transformer 219. Conduction of electric discharge device 176 also impresses its anode-cathode drop in the control element circuit of control element 32 of electric discharge device 180 after a time delay determined by a capacitor 220 connected in the control element circuit of electric discharge device 180. The time delay imposed by capacitor 220 is determined by the adjustment of an adjustable resistor 221 which is connected across the terminals of capacitor 220.

When electric discharge device 180 becomes conducting, it imposes its anode-cathode drop in the control element circuit of electric discharge device 177 and thus renders this electric discharge device conducting after the time delay imposed by the capacitor 222 also connected in this control element circuit. The time delay imposed by capacitor 222 is determined by the adjustment of an adjustable resistor 223 which is connected across the terminals of capacitor 222.

Conduction of electric discharge device 177 energizes the primary winding 208 of transformer 209 thus inducing in the secondary 210 of this transformer a voltage which renders electric discharge devices 172, 179 and 180 non-conducting. When electric discharge device 172 becomes non-conducting, primary winding 203 of transformer 204 is deenergized and the voltage of its secondary 205 disappears so that electric discharge device 170 may become conducting in response to conduction of electric discharge device 173 if the weld time has elapsed.

Conduction of electric discharge device 180 also applies its anode-cathode drop in the control element circuit of electric discharge device 178 to render this discharge device conducting after the time delay imposed by capacitor 224 also connected in this control element circuit. This time delay is set at one cycle by a fixed resistor 225 which is connected across the terminals of capacitor 224. When electric discharge device 178 conducts, it energizes the primary winding 226 of transformer 219 inducing in its secondary 218 a voltage which is applied in the control element circuit of electric discharge device 82 to render this electric discharge device non-conducting. It is thus seen that the timing circuit 223, 224 terminates the negative cool period whereas the timing circuit 224, 225 terminates the negative heat time.

As previously stated, the anode-cathode circuits of electric discharge devices 169 to 180, inclusive, each include an inductive device which causes the flow of anode-cathode current through these devices to continue on over into the next following negative half cycle after a positive half cycle of conduction and this anode-cathode drop is employed in the control element circuits of trailing electric discharge devices to render them conducting when their anode voltage is positive. In view of the description thus far given, it is apparent that several of these inductive devices are transformers whose primaries are connected in the anode-cathode circuits of the electric discharge devices identified therewith. In other cases the inductive device is nothing more than an inductor. This applies to electric discharge devices 169, 173, 175, 176 and 180 where these inductors have been respectively identified by reference numerals 227 to 231, inclusive. There may be circumstances where it is undesirable to have the inductive flow of current carry over too far into the next negative half cycle of voltage in which case the inductive device may have paralleled therewith a resistor of the desired value in order to control the extent of this carry over of current flow. In the drawing these resistors have not been shown in order to simplify it.

The cathode heating circuits for the various control electric discharge devices have not been illustrated in the drawings in order to avoid confusion with the circuits that have been illustrated. It is to be understood that such cathode heaters are employed and that they are heated by suitable sources of supply voltage. In order to protect against the effect of transient anode voltages, the firing electric discharge devices 24 to 29, inclusive, and the control electric discharge devices of the exciter shown in Fig. 1b are provided with capacitors 232 which are connected across their control elements and cathodes. Only a few of these capacitors have been identified by this reference number in order to reduce the confusion of reference numbers appearing on the drawings.

The system above described as to physical arrangement of parts and their functions will now be further described by setting forth one method of operating the same.

The system is energized by closing switch 49 which applies three phase voltage to conductors 46, 47 and 48 and through these conductors to the supply terminals 11, 12 and 13 of Fig. 1a. These terminals are also connected to the terminals of the exciter of Fig. 1b by conductors 46, 47 and 48 and conductors 43, 44 and 45. Thus, an A phase voltage appearing across supply terminals 11 and 12 also appears across the terminals of transformer 40 of the exciter, a B phase voltage appearing across supply terminals 12 and 13 also appears across the terminals of transformer 41 of the exciter, and a C phase voltage appearing across supply terminals 13 and 11 also appears across the terminals of transformer 42. Since the control shown in Fig. 1c is energized from the A phase exciter transformer 40, the electric discharge devices there illustrated are also energized with A phase voltage. The connections are such that the main electric discharge device 14 and its firing electric discharge device 24 may become conducting during positive half cycles of the A phase voltage as may the electric discharge devices shown in Fig. 1c which are connected between supply conductors 182 and 183. Also, the main electric discharge device 15 and its firing electric discharge device 25 may become conducting during negative half cycles of the A phase voltage as may the electric discharge devices shown in Fig. 1c as connected between supply conductors 184 and 183. Likewise, main electric discharge device 16 and its firing electric discharge device 26 may become conducting during positive half cycles of the B phase voltage and main electric discharge device 17 and its firing electric discharge device 27 may become conducting during negative half cycles of the B phase voltage. Also, due to their connections, electric discharge devices 84 and 153 of the exciter of Fig. 1b may become conducting during positive half cycles of the B phase voltage while electric discharge devices 85 and 155 of the exciter may become conducting during negative half cycles of the B phase voltage. So, also, the main electric discharge device 18 and its firing electric discharge device 28 may become conducting during positive half cycles of the C phase voltage and main electric discharge device 19 and its firing electric discharge device 29 may become conducting during negative half cycles of the C phase voltage. Also, electric discharge device 119 of the exciter may become conducting during positive half cycles of the C phase voltage and electric discharge device 123 of the exciter may become conducting during negative half cycles of this C phase voltage.

At start, none of the electric discharge devices having control elements is conducting. The firing electric discharge devices 24 to 29, inclusive, are held non-conducting when their anode voltages are positive by the negative bias voltages in the timing branches of their control element circuits supplied, respectively, by capacitors 66, 64, 96, 103, 130 and 139. Due to the conductivity of the unidirectional conducting devices 34 to 39, inclusive, the phase shift voltages which are continuously introduced into the respective heat control branches of the control element circuits of the firing electric discharge devices 24 to 29 are ineffective and appear as voltage drops across the resistors 58 to 63, respectively, connected in circuit with these heat control phase shift voltages. Consequently, the three phase windings, 5, 6, and 7, of the welding transformer are not energized and there is no flow of welding current in the secondary 2 of this transformer to the electrode 3 of the welding machine.

The system is set into operation by closing pushbutton switch 185, shown in Fig. 1c. Prior to the closure of this switch, electric discharge devices 168 and 169 are held non-conducting during positive half-cycles of A phase voltage by the negative bias applied to the control elements 181 of these electric discharge devices by capacitor 186. As previously stated, this capacitor is charged by grid rectification of the electric discharge devices 168 and 169 during negative half-cycles of the A phase voltage from the energization supplied by the secondary 187 of transformer 76. Since electric discharge device 169 is held non-conducting, the remaining electric discharge devices shown in Fig. 1c are also held non-conducting, since they operate in trailing response to prior conduction of this electric discharge device 169. When the pushbutton switch 185 is closed, control elements 181 of electric discharge devices 168 and 169 are connected to their cathodes, and, if these electric discharge devices are released for conduction by the dissipation of the negative control voltage of capacitor 194 after the delay imposed by adjustable resistor 195 following some prior welding operation, electric discharge devices 168 and 169 become conducting.

Conduction of electric discharge device 168 energizes the operating coil of a solenoid valve identified as S. V. which opens to admit pressure fluid to the pressure cylinder of the welder, which then operates to bring the welding electrodes 3 into engagement with the work 4. Conduction of electric discharge device 169 results in conduction of electric discharge device 171 during the next half-cycle of A phase voltage and conduction of this electric discharge device energizes the primary 197 of transformer 191 to induce a voltage in the secondary 190 of this transformer which neutralizes the voltage of winding 187 of transformer 76 so that thereafter electric discharge devices 168 and 169 conduct, even though pushbutton switch 185 be allowed to open. This conduction continues until conduction of electric discharge device 174 energizes the primary 198 of a transformer 189 to induce voltages in the secondaries 188 and 196 of this transformer. The voltage induced in the secondary 188 of transformer 189 neutralizes the voltage of the secondary 190 of transformer 191, thereby returning conditions to their initial condition wherein the voltage of winding 187 of transformer 76 is again effective for charging capacitor 186 and applying a negative bias voltage to the control elements 181 of electric discharge devices 168 and 169. The voltage induced in the secondary 196 of transformer 189 impresses a negative voltage on the control elements 32 of electric discharge device 168 and 169 also holding these electric discharge devices non-conducting until the off period between successive welding operations has expired by the discharge of capacitor 194 through its adjustable discharge resistor 195.

After a time period identified as the "squeeze" period and determined by the timing circuit 199, 200, conduction of electric discharge device 169 renders electric discharge devices 172 and 173 conducting. This squeeze period is provided so that the electrodes may be brought into engagement with the work with the desired pressure before welding current is supplied through these electrodes to the work.

Conduction of electric discharge device 172 causes conduction in trailing response to electric discharge devices 175 and 74. Conduction of electric discharge device 173 at the same time that electric discharge device 172 becomes conducting, initiates the weld timing operation determined by the timer 206, 207 which determines when the anode-cathode drop of electric discharge device 173 is effective insofar as the control element 32 of electric discharge device 170 may conduct. So long, however, as electric discharge device 172 conducts, electric discharge device 170 cannot conduct, because of the restraint imposed by its control element 181, which is energized by the voltage of the secondary 205 of transformer 204 whose primary 203 is energized so long as electric discharge device 172 is conducting.

Conduction of electric discharge device 175 initiates the timing operation which determines the length of the positive half-cycle of low frequency current which is supplied by the converter. This period, which may be identified as the positive heat period, is determined by the timing circuit 213, 214 in the control element circuit of control element 32 of electric discharge device 179. This plus heat period is followed by a plus cool period which is determined by the timing circuit 216, 217 in the control element circuit of electric discharge device 176. Following this plus cool period, there is a minus heat period which is determined by the timing circuit 220, 221 in the control element circuit for control element 32 of electric discharge device 180. This minus heat period, or the period of the negative half-cycle of the low frequency current supplied by the converter, is followed by a negative cool period determined by the timing circuit 222, 223 in the control element circuit of electric discharge device 177. The negative heat period is terminated under some conditions by the timing circuit 224, 225 in the control element circuit of electric discharge device 178. In the operation about to be described, it will be assumed that the timer 213, 214 is set for a one-cycle delay period and that the fixed timing circuit 224, 225 is also set for a one-cycle delay. The other timers, it will be assumed, are set for zero cycles delay.

When electric discharge device 74 becomes conducting during a positive half-cycle of the A phase voltage in trailing response to conduction of electric discharge device 172, it energizes the primary 73 of transformer 72 and induces voltages in the secondaries 71 and 83 of this transformer. The voltage induced in the secondary winding 71 of transformer 72 is introduced into the timing branch of the control element circuit of firing electric discharge device 24 where it appears across resistor 70 to the terminals of which the terminals of the secondary 71 are connected. This voltage across resistor 70 is sufficient in magnitude to overcome the bias voltage of capacitor 66 and, consequently, renders the unidirectional conducting device 34 non-conducting. As this occurs early in the half-cycle of positive anode voltage of the firing electric discharge device 24, this device may then become conducting in response to the phase shift voltage in its heat control branch supplied by the secondary 57 of the phase shift transformer 50. Firing electric discharge device 24 thus becomes conducting at the time determined by the adjustment of the phase shift circuit including resistors 53, 54 and capacitor 52. When firing electric discharge device 24 becomes conducting, it energizes the igniter 23 of main or load circuit electric discharge device 14 which then becomes conducting to supply positive A phase voltage to the winding 5 of the welding transformer 1. This operation will be repeated each time the electric discharge device 74 becomes conducting.

The number of times that electric discharge device 74 becomes conducting depends on the timing interval of timer circuit 213, 214 in the control element circuit for control element 32 of electric discharge device 179. With this timer set for a one-cycle delay period, electric discharge device 74 will become conducting twice, whereupon electric discharge device 179 will become conducting and energize the primary winding 215 of transformer 202 to generate a voltage in the secondary 201 of this transformer which applies a voltage to the control element of electric discharge device 74 sufficient to render this electric discharge device non-conducting.

Each time electric discharge device 74 becomes conducting it also induces a voltage in the secondary 83 of transformer 72 by reason of the energization of the primary winding 73 of this transformer. The voltage of secondary winding 83 is applied in the control element circuit of electric discharge device 84 of the exciter and renders this electric discharge device conducting to energize the primary winding 86 of transformer 87 and thereby induce voltages in the secondaries 94 and 118 of this transformer. The voltage induced in the secondary 94 of transformer 87 is applied across resistor 95 in the timing branch of the control element circuit of firing electric discharge device 26 in opposition to the negative bias voltage provided by capacitor 96, also located in this branch of this control element circuit. As this voltage is greater than the voltage of capacitor 96, unidirectional conducting device 37 becomes non-conducting and the phase shift voltage provided in the heat control branch of the control element circuit for firing electric discharge device 26 becomes effective to render this electric discharge device conducting at the phase angle determined by the phase shift adjustment of the B phase shift circuit. This phase shift voltage is supplied by the secondary 103 of the phase shift transformer 110 for phase B. When firing electric discharge device 26 becomes conducting, it energizes the igniter 23 of main or load circuit electric discharge device 16 which then becomes conducting when its anode voltage is more positive than the anode voltage of main electric discharge device 14. This transfers the flow of current from winding 5 to winding 6 of the welding transformer and continues the build-up of flux in the core of this transformer which is inducing low frequency current and voltage in the secondary 2 thereof.

The voltage also induced in the secondary 118 of transformer 87 is applied in the control element circuit of electric discharge device 119 whose anode-cathode circuit is connected across transformer 42 and thus energized by the C phase voltage of the three phase source of supply. Conduction of electric discharge device 119 energizes the primary 126 of transformer 127 with C phase voltage and introduces control voltages in the secondaries 128 and 152 of this transformer. The voltage induced in the secondary 128 of this transformer is introduced in the timing branch of the control element circuit in opposition to the negative bias voltage provided by capacitor 130 for firing electric discharge device 28. Again, since this voltage is greater than the bias voltage, unidirectional conducting device 38 becomes non-conducting and firing electric discharge device 28 is then placed under the control of the phase shift voltage in the heat control branch of its control element circuit and becomes conducting. This phase shift voltage is supplied by the secondary 142 of the phase shift transformer 144 connected in the phase shift circuit embodying capacitor 149 and adjustable resistors 150 and 151 associated with the transformer 42 of the C phase exciter voltage. When firing electric discharge device 28 becomes conducting, it energizes the igniter 23 of main or load circuit electric discharge device 18 which then becomes conducting when its anode voltage is more positive than the anode voltage of main electric discharge device 16. This transfers the flow of current from winding 6 to winding 7 of the welding transformer 1 and continues the build-up of flux in the core of this transformer.

The voltage also induced in the secondary 152 of transformer 127 is supplied in the control element circuit of electric discharge device 153 and renders this electric discharge device conducting. The polarity connection of the secondary 152 of transformer 127 is such that the carryover voltage occurring after a period of energization of its primary 126 is in a positive direction relative to the B phase anode voltage of electric discharge device 153. Consequently, this electric discharge device 153 fires early in its positive half-cycle of anode voltage which occurs at a time late in the half-cycle of a positive A phase voltage which is applied to the anode of firing electric discharge device 24. The firing of electric discharge device 153 induces a B phase voltage in the secondary 162 of transformer 161 by reason of the energization of its primary winding 160. This voltage is applied across resistor 163 in the timing branch of the control element circuit for firing electric discharge device 24. The voltage value obtained across resistor 163 is sufficient to overcome the negative bias voltage of capacitor 66 connected in circuit therewith. It has no effect, however, because firing electric discharge device 24 and its associated main electric discharge device 14 has already been rendered conducting a second time by the turn-on voltage which appeared across resistor 70 in the timing branch of the control element circuit of firing electric discharge device 24 as a result of electric discharge device 74 conducting for a second time and transferring current flow from winding 7 to winding 5 of the welding transformer by conduction of electric discharge device 14 when its anode voltage is more positive than that of electric discharge device 18. However, after electric discharge device 74 has conducted for the last time and the A, B and C phases of the three phase supply have twice energized in sequence the primary windings 5, 6, and 7 of the welding transformer 1, the firing of electric discharge device 153 will again render firing electric discharge device 24 conducting late in the half-cycle of its A phase anode voltage which occurs after a positive C phase voltage. Consequently, firing electric discharge device 24 will again be rendered conducting to take over the conduction of C phase current supply to the load and continue the inverter action of the converter beyond the negative C phase voltage so that inverter action may continue during the next negative A phase voltage when the control has released firing electric discharge device 25 for conduction as will be described below. Even though firing electric discharge device 25 is released for conduction, it does not conduct because inverter flow of current through main electric discharge device 14 limits its applied anode voltage to the anode-cathode drop across electric discharge device 14. When, however, at the end of the inverter action of the main electric discharge device 14, current flow therethrough decreases to zero, firing electric discharge device 25 has the phase voltage impressed thereon and immediately renders main electric discharge device 15 conducting and initiates the negative half-cycle of current flow with only a momentary zero period between the positive and negative periods of low frequency current flow.

When conduction of electric discharge device 179 of the coordinator shown in Fig. 1c energized transformer 202 and thereby prevented further repeat conduction of electric discharge device 74, it also caused electric discharge device 176 to become conducting in trailing response during the next half cycle of voltage since the timing circuit 216, 217 was set for zero cycles of delay. Conduction of electric discharge device 176 then rendered the electric discharge device 82 conducting in trailing response during the next half-cycle of voltage and conduction of this electric discharge device 82 energized the primary winding 81 of transformer 80 inducing voltages in its secondary windings 79 and 85. The voltages induced in the secondaries 79 and 85 of transformer 80 initiate a sequence of operations for the negative A, B and C phase voltages to provide reverse current flow energization of the primaries 5, 6 and 7 of the welding transformer 1. This sequence will terminate with conduction of electric discharge device 155 which will function to cause main electric discharge device 15 to produce inverter operation of the converter until the negative half-cycle of current flow decreases to zero whereupon the main positive A phase electric discharge device 14 will become immediately conducting for reasons given above with regard to main negative A phase electric discharge device 15.

As stated above when electric discharge device 176 became conducting, it initiated conduction of electric discharge device 82 during the next half-cycle. It also initiated conduction of electric discharge device 180 at this same time, since the timing circuit 220, 221 in the control element circuit for control element 32 of this electric discharge device 180 was set for zero cycles delay. Conduction of electric discharge device 180 immediately rendered electric discharge device 177 conducting during the next half-cycle, since the timing circuit 222, 223 in the control element circuit of this electric discharge device was set for zero cycles delay. Conduction of electric discharge device 177 energizes the primary winding 208 of transformer 209 inducing a voltage in the secondary 210 of this transformer which is applied to the control elements 181 of electric discharge devices 172, 179 and 180. If the weld time has elapsed conduction of electric discharge device 178 maintains these electric devices non-conducting and after the hold time determined by timer 211, 212 in the control element circuit of electric discharge device 174, the whole system will shut down. In the operation just described, electric discharge device 178 did not function. There are adjustments, however, where this electric discharge device will come into operation after a one cycle delay period following conduction of electric discharge device 180. When this occurs, conduction of electric discharge device 178 terminates the negative heat period by energizing the primary 226 of transformer 219 and thereby inducing a voltage in the secondary 218 of this transformer which is applied to the control element of electric discharge device 82 and prevents it from again becoming conducting.

Further descriptions of the organization and operation of our system illustrated in Figs. 1a, 1b and 1c will now be given by referring to the waveshape diagram of Fig. 2. In this figure the A, B and C phase voltages of the three phase source of supply have been illustrated respectively by sine waves shown in full, dot-dash and dotted lines. The positive half-cycle of low frequency current flow is shown at 233 beginning at the power factor phase angle of current flow during phase A when main or load circuit control electric discharge device 14 becomes conducting at 234 and continuing to point 235 where the current passes through zero and the negative half-cycle of low frequency current flow 236 begins with conductions of main electric discharge device 15. The shaded portions of the A, B and C voltage waves beginning at the left and continuing to line 237 represent the anode voltages applied respectively to the windings 5, 6 and 7 of the welding transformer by the main electric discharge devices 14, 16 and 18 from the A, B and C phases respectively. Beginning at line 237 and continuing toward the right, the shaded portions of the A, B and C waves indicate the voltages applied to the windings 5, 6 and 7 of the welding transformer through the main electric discharge devices 15, 17 and 19. Only the beginning of the negative half-cycle of current flow has been illustrated in this diagram. Each time the windings 5, 6 and 7 of the welding transformer are energized in phase sequence by conduction of the main electric discharge devices 14, 16 and 18, flux in the core of the welding transformer is increased and the secondary current induced in the winding 2 of the transformer increases stepwise as illustrated until at the last or second conduction of main electric discharge device 18 when the current begins to decrease because the main electric discharge device 14 for the A phase is not again rendered conducting. However, current continues to flow through the main electric discharge device 18 even after its anode voltage has become negative due to the inductive nature of the transformer load. At time 238 which is near the end of the positive A phase voltage, main electric discharge device 14 is again rendered conducting by the turn-on voltage applied across resistor 163 in the timing branch of the control element circuit of its firing electric discharge device 24 as a result of the conduction of electric discharge device 153 in the exciter circuit. Main electric discharge device 14 then becomes again conducting and conduction carries over to the period when its anode voltage becomes negative up and until time 237 when the current has decreased to zero. Thus, during the times when the anode voltages of electric discharge devices 18 and 14 are negative, current flow continued in decreasing magnitude in a positive direction and inverter operation of the system was secured.

At the time main electric discharge device 14 is conducting for inverter action, main electric discharge device 15 is excited for conduction but passes no current because its anode voltage is only the tube drop of main electric discharge device 14 which is insufficient to initiate anode-cathode current flow. Immediately, however, that main electric discharge device 14 becomes non-conducting when the positive half-cycle of low frequency current flow passes through zero, sufficient anode phase voltage of phase A is applied to main electric discharge device 15 which immediately became conducting and initiates current flow for the negative half-cycle of low frequency current.

The time when main electric discharge device 14 was excited for inverter action near the end of a positive half-cycle of A phase voltage, is determined as previously stated by the turn-on voltage applied across resistor 163 in opposition to the bias of capacitor 66 in the timing branch of the control element circuit of firing electric discharge device 24 for this main electric discharge device 14. In Fig. 2 the negative bias of capacitor 66 has been indicated at 239 and the turn-on voltage appearing across resistor 163 has been indicated at 240. When this turn-on voltage occurs late in a positive half-cycle of the A phase voltage when the main electric discharge device 14 is already conducting, nothing happens because the main electric discharge device is conducting. However, further on at time 238 when main electric discharge device 14 is not conducting, the application of this turn-on voltage renders it conducting by initiating conduction in the firing electric discharge device 24 for this main electric discharge device 14. Conduction is initiated because the negative bias is overcome and the control element circuit for the firing electric discharge device 24 functions in response to its heat control phase shift voltage which, at this time, is effective for producing conduction. The diagram of Fig. 2 has not been complicated by indicating this phase shift voltage.

This turn-on voltage 240 appearing across resistor 163 in the control element circuit of firing electric discharge device 24 for main electric discharge device 14, may occur quite late in the positive half-cycle of the A phase voltage because the voltage applied across the anode-cathode circuits of the firing and main electric discharge devices 24 and 14 is much greater than the phase voltage and lags the phase voltage. In the diagram this anode voltage has been represented by the wave 241 and is the vector sum of the A phase voltage and the B or C phase voltages depending upon which of the B or C phases is conducting. When the B phase is conducting the anode voltage of the electric discharge devices lead the phase voltage by 30° whereas when the C phase is conducting the voltage lags by 30°. This is a direct result of the coupling of the primary windings 5, 6 and 7 of the welding transformer since the winding that is conducting current in response to one phase voltage induces an opposite voltage in the windings coupled therewith.

In order to show the advantages of our invention we have illustrated in Fig. 2 by the dot-and-dash line 242 the manner in which current flow would decrease to zero at the end of a positive half-cycle of the low frequency current if inverter action of the main electric discharge device 14 during the A phase voltage had not been introduced. As will be seen by reference to Fig. 2, the current flow had not fallen to zero value at the time the C phase voltage again became positive and consequently there was an increase in current flow which carried over into the next half cycle of negative C phase voltage. Without our invention current flow for the negative half-cycle of low frequency current could not have been initiated until after this zero occurrence of current flow without resulting in the commutation fault above referred to. This would have introduced a considerable time delay between the positive and negative half-cycles of low frequency current flow which it is one of the objects of our invention to avoid.

In conclusion, it is considered desirable to repeat the operational sequence of the electric discharge devices in the load circuits and in the exciter control circuits by identifying these electric discharge devices in accordance with their phase connections. With this in view, the main electric discharge devices 14, 16 and 18 which are respectively connected to the A, B and C phases of the three phase source of supply and poled for conducting current of one polarity, will be identified as 1A, 1B and 1C, respectively. Likewise, the main electric discharge devices 15, 17 and 19 which are respectively connected to the A, B and C phases and poled for conducting current of the opposite polarity will be identified respectively as 2A, 2B and 2C. Likewise, exciter control electric discharge device 74 which is connected to the A phase voltage for conducting current of one polarity will be referred to as A1 and electric discharge device 82 which is also connected to the A phase voltage and poled for conducting current in the opposite direction will be referred to as A2. In like manner, control electric discharge devices 84 and 153 which are connected to the B phase voltage and poled for conducting current of one polarity will be identified respectively as B1 and B3 and electric discharge devices 85 and 155 which are also connected to the B phase voltage and poled for conducting current in the opposite direction will be referred to as B2 and B4 respectively. So, also, electric discharge device 119 which is connected to the C phase voltage and poled to conduct current of one polarity will be identified as C1 and control electric discharge device 123 which is also connected to the C phase voltage and poled for conducting in the opposite direction will be referred to as C2. With this designation conduction of A1 initiates conduction of 1A and B1. Conduction of B1 initiates conduction of 1B and also of C1. Conduction of C1 initiates conduction of 1C and also conduction of B3 which initiates conduction of 1A late in its positive half-cycle of anode voltage. This sequence continues each time A1 conducts current. After a predetermined number of times of A1 conduction, A2 becomes conducting for a predetermined number of times. Conduction of A2 initiates conduction of 2A and B2. Conduction of B2 initiates conduction of 2B and also initiates conduction of C2. Conduction of C2 initiates conduction of 2C and also conduction of B4 which initiates conduction of 2A late in its half-cycle of positive anode voltage for inverter action. This last-mentioned sequence will continue for as often as A2 is rendered conducting. A1 and A2 are rendered conducting for a predetermined number of times with suitable times therebetween by operation of the sequencer and coordinator above described.

It is, of course, apparent that our invention may be variously modified without departing from the spirit and scope of the teachings thereof. Other arrangements will occur to those skilled in the art, and modifications of the circuits employed may be made in accordance with particular circumstances such as the type of electric discharge devices employed, the employment of equivalent circuits and the like. We therefore aim in the appended claims to cover all such changes and modifications as fall within the true spirit and scope of our invention.

What we claim as new and desire to secure by Letters Patent of the United States is:

1. Apparatus comprising three supply terminals adapted to be connected to a three-phase source of alternating voltage, three pairs of load terminals each pair of which is adapted to be connected to an inductive load, means for energizing said pairs of load terminals in phase sequence from said supply terminals for a predetermined number of times with voltages of one polarity beginning with one phase voltage and in phase sequence including the remaining phase voltages and after a time delay with voltages of the opposite polarity beginning with said one phase voltage and in phase sequence including the remaining phase voltages, means for adjusting said time delay, and means effective during said adjustable time delay for again applying said one phase voltage to its load terminals at a time near the end of that half cycle of voltage which is of the same polarity as an immediately preceding sequence of voltages begun with said one phase voltage.

2. Apparatus comprising three supply terminals adapted to be connected to a three-phase source of alternating voltage, three pairs of loaded terminals adapted to be connected respectively with each phase of a three-phase inductive load, pairs of parallel connected electric discharge devices each having an anode, a cathode, a control element and a control element circuit connecting its said cathode with its said control element, one of said electric discharge devices of each of said pairs being poled to conduct half cycles of alternating current of one polarity and the other thereof being poled to conduct half cycles of alternating current of the opposite polarity, means for introducing in the control element circuits of said electric discharge devices of said pairs thereof which are poled for conducting current of one polarity, turn-on voltages which are applied in phase sequence thereto beginning with one of said pairs of electric discharge devices and continuing for a predetermined number of complete phase sequences of conduction of said electric discharge devices, means for introducing in the control element circuits of said electric discharge devices of said pairs thereof which are poled for conducting current of the opposite polarity, turn-on voltages which are applied in phase sequence thereto beginning with the same one of said pairs of electric discharge devices and continuing for a predetermined number of complete phase sequences of conduction of said electric discharge devices, adjustable timing means for introducing adjustable time intervals between said applications of turn-on voltages by said last two mentioned means, and means for introducing in the control element circuit of that one of said pair of electric discharge devices which has the same polarity of conduction as a previously completed sequence of phase conduction by electric discharge devices of the same polarity, a control voltage which is effective during said adjustable time intervals for again initiating conduction thereof near the end of a positive half cycle of its anode voltage which immediately follows said completed phase sequence of conduction.

3. Apparatus comprising three supply terminals adapted to be connected to a three-phase source of alternating voltage, three pairs of load circuit terminals adapted to be connected respectively with each phase of a three-phase inductive load, pairs of parallel connected electric discharge devices each having an anode, a cathode, a control element and a control element circuit connecting its said cathode with its said control element, one of said electric discharge devices of each of said pairs being poled to conduct half cycles of alternating current of one polarity and the other thereof being poled to conduct half cycles of alternating current of the other polarity, means for applying in phase sequence in the control element circuits of said electric discharge devices which are poled for conducting current of the one polarity, turn-on voltages which render said electric discharge devices conducting in phase sequence beginning with an electric discharge device of one of said pairs and continuing for a predetermined number of complete sequences, and after an adjustable time delay for applying in phase sequence in the control element circuits of said electric discharge devices which are poled for conducting current of the other polarity, turn-on voltages which render said electric discharge devices conducting in phase sequence beginning with the other electric discharge device of said one of said pairs and continuing for the same predetermined number of complete sequences, means for adjusting said time delay, and means for applying in the control element circuit of that electric discharge device which initiates a phase sequence of conduction of the same polarity, a turn-on voltage which occurs during said adjustable time delay near the end of its positive half cycle of anode voltage which follows immediately after a completed sequence of phase conduction by said electric discharge devices of the same polarity.

4. Apparatus comprising three supply terminals adapted to be connected to a three-phase source of alternating voltage, three pairs of load terminals adapted to be connected respectively with each phase of a three-phase inductive load, pairs of parallel connected electric discharge devices each having an anode, a cathode, a control element and a control element circuit connecting its said cathode with its said control element, one of said electric discharge devices of each of said pairs being poled to conduct positive half cycles of alternating current and the other thereof being poled to conduct negative half cycles of alternating current, means for connecting each of said pairs of load terminals between different pairs of said supply terminals in circuit with a different one of said pairs of electric discharge devices, means for introducing a turn-on control voltage in the control element circuit of one of said positive half cycle conducting electric discharge devices for a predetermined number of times and in phase sequence in the control element circuits of the remainder of said positive half cycle conducting electric discharge devices for the same number of times, means effective after an adjustable time delay for introducing for the same predetermined number of times above specified a turn-on voltage in the control element circuit of that one of said negative half cycle conducting electric discharge device which is paired with said positive half cycle conducting electric discharge device first rendered conductive by said last mentioned means and in phase sequence in the control element circuits of the remainder of said negative half cycle conducting electric discharge device for the same number of times, means for adjusting said time delay, and means for introducing in the control element circuit of said one of said positive half cycle conducting electric discharge devices a control voltage which renders it conducting during said adjustable time delay near the end of its positive half cycle of anode voltage which follows immediately after the end of a complete phase sequence of conduction of said positive half cycle conducting electric discharge devices.

5. Apparatus comprising three supply terminals adapted to be connected with a three-phase source of alternating voltage, three pairs of the load circuit terminals each pair of which is adapted to be connected to a different phase circuit of a three-phase inductive load, means including first, second and third pairs of parallel connected electric discharge devices for respectively connecting different ones of said pairs of load circuit terminals with different pairs of said three supply terminals, each of said electric discharge devices having an anode, a cathode, a control element and a control element circuit connecting its said cathode with its said control element and each pair of said electric discharge devices also having one electric discharge device poled for conducting current of one polarity and the other electric discharge device poled for conducting current of the opposite polarity, first, second, third and fourth pairs of control electric discharge devices each having an anode, a cathode, a control element and a control element circuit connecting its said cathode with its said control element, means for connecting said first pair of control electric discharge devices for energization by the same phase voltage as applied to said first pair of load circuit electric discharge devices, said second and fourth pairs of control electric discharge devices for energization by the same phase voltage as said second pair of load circuit electric discharge devices and said third pair of control electric discharge devices for energization by the same phase voltage as said third pair of load circuit electric discharge devices, one of each of said pairs of control electric discharge devices being poled relative to its phase voltage for conducting current of one polarity and the other being poled for conducting current of the opposite polarity, means for applying for a predetermined number of times in said control element circuit of one of said electric discharge devices of said first pair of control electric discharge devices, a voltage which renders it conducting and after an adjustable time delay for also applying a control voltage in said control element circuit of the other of said electric discharge devices of said first pair of control electric discharge devices which renders it conductive for the same number of times, means for adjusting said time delay, means responsive to anode-cathode conduction of said electric discharge devices of said first pair of control electric discharge devices for introducing in said control element circuits of said second pair of control electric discharge devices having a like polarity of anode-cathode connection, voltages which render said second pair of control electric discharge devices conducting in phase sequence and for introducing in said control element circuits of said first pair of load circuit electric discharge devices having a like polarity of anode-cathode connection, voltages which render said first pair of load circuit electric discharge devices conducting, means responsive to anode-cathode conduction of said electric discharge devices of said second pair of control electric discharge devices for introducing in said control element circuits of said third pair of control electric discharge devices having a like polarity of anode-cathode connection, voltages which render said third pair of control electric discharge devices conducting in phase sequence and for introducing in said control element circuits of said second pair of load circuit electric discharge devices having a like polarity of anode-cathode connection, voltages which render said second pair of load circuit discharge devices conducting in phase sequence, means responsive to anode-cathode conduction of said electric discharge devices of said third pair of control electric discharge devices for introducing in said control element circuits of said fourth pair of control electric discharge devices having a like polarity of anode-cathode connection, voltages which render said fourth pair of control electric discharge devices conducting in phase sequence and for introducing in said control element circuits of said third pair of load circuit electric discharge devices having a like polarity of anode-cathode connection, voltages which render said third pair of load circuit discharge devices conducting in phase sequence, and means responsive to anode-cathode conduction of said electric discharge devices of said fourth pair of control electric discharge devices for introducing in said control element circuits of said first pair of load circuit electric discharge devices having a like polarity of anode-cathode conduction, voltages which occur during said adjustable time delay near the end of a positive half cycle of anode voltage of said first pair of load circuit electric discharge devices and render said first pair of load circuit electric discharge devices conducting.

6. Apparatus comprising three terminals between different pairs of which the A, B, and C phases of a three-phase source of alternating voltage are adapted to be connected, a pair of load terminals for each of the A, B and C phases of an inductive three-phase load, means for supplying from said supply terminals to said pairs of load terminals a complete phase sequence of positive A, B and C voltages for a predetermined number of times followed after an adjustable time delay by a complete phase sequence of negative A, B, and C voltages for a predetermined number of times, means for adjusting said time delay, and means effective during said adjustable time delay for initiating conduction late in the next half cycle of an A phase voltage of the same polarity as that of an immediately preceding sequence of A, B, C voltages.

7. Apparatus comprising three supply terminals different pairs of which are adapted to be connected to the A, B and C phases of a three-phase source of supply voltage, pairs of load terminals adapted to be connected respectively to each of the A, B and C phases of an inductive three-phase load, load circuit electric discharge devices each having an anode, a cathode, a control element and a control element circuit connecting its said cathode with its said control element, means including parallel connected pairs of said load circuit electric discharge devices for controlling the connections of each of said pairs of load circuit phase terminals with a different pair of said three supply terminals, said pairs of load circuit electric discharge devices being identified as 1A and 2A, 1B and 2B and 1C and 2C according to their phase connections with said A, B and C pairs of load circuit terminals, and said 1A, 1B and 1C electric discharge devices being poled to conduct anode-cathode current of one polarity to the load and said 2A, 2B and 2C electric discharge devices being poled to conduct anode-cathode current of the opposite polarity to the load, a three-phase excitation circuit connected with and adapted to be energized from said three supply terminals with A, B and C phase voltages of the three-phase source of supply connected to said supply terminals, pairs of control electric discharge devices each having an anode, a cathode, a control element and a control element circuit connecting its said cathode with its said control element, said pairs of control electric discharge devices being identified according to their A, B and C phase connections as A1 and A2, B1 and B2, B3 and B4 and C1 and C2 and having their anode-cathode circuits connected with said phase voltages of said excitation circuit so that said A1, B1, B3 and C1 electric discharge devices may conduct during half cycles of phase voltage of one polarity and said A2, B2, B4 and C2 electric discharge devices may conduct during half cycles of phase voltage of the opposite polarity, means for introducing in the control element circuit of said A1 control electric discharge device, a turn-on voltage which initiates anode-cathode conduction thereof when its anode is positive, means responsive to conduction of said A1 control electric discharge device for introducing a turn-on voltage in the control element circuit of said 1A load circuit electric discharge device to initiate anode-cathode conduction thereof and a turn-on voltage in the control element circuit of said B1 control electric discharge device which initiates anode-cathode conduction thereof in phase sequence when its anode voltage is positive, means responsive to conduction of said B1 control electric discharge device for introducing a turn-on voltage in the control element circuit of said 1B load circuit electric discharge device which initiates anode-cathode conduction thereof in phase sequence when its anode voltage is greater than that of said 1A load circuit electric discharge device and a turn-on voltage in the control element circuit of said C1 control electric discharge device which initiates its anode-cathode conduction in phase sequence when its anode is positive, means responsive to conduction of said C1 control electric discharge device for introducing a turn-on voltage in the control element circuit of said 1C load circuit electric discharge device which renders it conducting in phase sequence when its anode voltage is greater than the anode voltage of said 1B load circuit electric discharge device and a turn-on voltage in the control element circuit of said B3 control electric discharge device which renders it conducting in phase sequence when its anode voltage is positive, means responsive to conduction of said B3 control electric discharge device for introducing a turn-on voltage in the control element circuit of said 1A load circuit discharge device which renders it conducting in phase sequence near the end of a positive half cycle of its anode voltage, means for introducing into the control element circuit of said A2 control electric discharge device a turn-on voltage which initiates anode-cathode conduction thereof when its anode voltage is positive, means responsive to conduction of said A2 control circuit electric discharge device for introducing a turn-on voltage in the control element circuit of said 2A load circuit electric discharge device to initiate anode-cathode conduction thereof and a turn-on voltage in the control element circuit of said B2 control circuit electric discharge device which initiates anode-cathode conduction thereof in phase sequence when its anode voltage is positive, means responsive to conduction of said B2 control circuit electric discharge device for introducing a turn-on voltage in the control element circuit of said 2B load circuit electric discharge device which initiates its anode-cathode conduction in phrase sequence when its anode voltage is greater than that of said 2A load circuit electric discharge device and a turn-on voltage in the control element circuit of said C2 control electric discharge device which initiates its anode-cathode conduction in phase sequence when its anode is positive, means responsive to conduction of said C2 control electric discharge device for introducing a turn-on voltage in the control element circuit of said 2C load circuit electric discharge device which initiates its anode-cathode conduction in phase sequence when its anode voltage is more positive than the anode voltage of said 2B load circuit electric discharge device and a turn-on voltage in the control element circuit of said B4 control electric discharge device which renders it conducting in phase sequence when its anode voltage is positive, means responsive to conduction of said B4 control electric discharge device for introducing a turn-on voltage in the control element circuit of said 2A load circuit electric discharge device which renders it conducting in phase sequence near the end of a positive half cycle of its anode voltage, means for controlling the number of times said turn-on voltage is applied in the control element circuit of said A1 control electric discharge device during consecutive positive half cycles of its anode voltage, means for controlling the number of times said turn-on voltage is applied in the control element circuit of said A2 control electric discharge device during consecutive positive half cycles of its anode voltage, means for adjustably controlling a period of delay between a period of conduction of said A2 control electric discharge device after a period of conduction of said A1 control electric discharge device, means for adjustably controlling a period of delay between a period of conduction of said A1 control electric discharge device after a period of conduction of said A2 control electric discharge device, and means for controlling the overall time of operation of said A1 and A2 control electric discharge devices.

References Cited in the file of this patent

UNITED STATES PATENTS

| | | |
|---|---|---|
| 1,980,461 | Widmer | Nov. 13, 1934 |
| 2,356,859 | Leathers | Aug. 29, 1944 |
| 2,431,262 | Longini | Nov. 18, 1947 |
| 2,474,867 | Sciaky | July 5, 1949 |
| 2,619,625 | Parsons | Nov. 25, 1952 |